United States Patent
Kim (10) Patent No.: US 7,800,726 B2
(45) Date of Patent: Sep. 21, 2010

(54) POLARIZING PLATE CONTAINING POLYMER BALL MIXED ANTI-GLARE LAYER AND LIQUID CRYSTAL DISPLAY USING THE SAME

(75) Inventor: Hyoung June Kim, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 343 days.

(21) Appl. No.: 11/889,997

(22) Filed: Aug. 17, 2007

(65) Prior Publication Data
US 2008/0049174 A1 Feb. 28, 2008

(30) Foreign Application Priority Data
Aug. 22, 2006 (KR) .................. 10-2006-0079395

(51) Int. Cl.
*G02F 1/1335* (2006.01)
(52) U.S. Cl. .................. 349/137; 349/96; 349/112; 359/601
(58) Field of Classification Search .......... 349/96, 349/112, 137; 359/601
See application file for complete search history.

(56) References Cited

U.S. PATENT DOCUMENTS

| | | | | |
|---|---|---|---|---|
| 5,847,795 A | * | 12/1998 | Satoh et al. | 349/137 |
| 6,572,961 B1 | * | 6/2003 | Koyama et al. | 428/323 |
| 7,030,944 B2 | * | 4/2006 | Fujimoto | 349/64 |

FOREIGN PATENT DOCUMENTS

WO    WO 2004055584 A1 * 7/2004

* cited by examiner

*Primary Examiner*—Michael H Caley
(74) *Attorney, Agent, or Firm*—McKenna Long & Aldridge (57) ABSTRACT

A polarizing plate, which can achieve improved brightness with a reduced total-reflection region by appropriately regulating the height or interval of protrusions formed at a surface of the polarizing plate, thereby reducing eye fatigue, and a liquid crystal display device using the polarizing plate are disclosed. The polarizing plate includes a polarizing film, a protective layer formed at a lower surface of the polarizing film, and an anti-glare layer formed at an upper surface of the polarizing film, the anti-glare layer containing a plurality of polymer balls mixed therein such that protrusions, having substantially the same height as one another, are formed at a surface of the anti-glare layer by a predetermined interval.

12 Claims, 8 Drawing Sheets

POLARIZING PLATE CONTAINING POLYMER BALL MIXED ANTI-GLARE LAYER AND LIQUID CRYSTAL DISPLAY USING THE SAME

This application claims the benefit of Korean Patent Application No. P 2006-079395, filed on Aug. 22, 2006, which is hereby incorporated by reference for all purposes as if fully set forth herein.

BACKGROUND OF THE INVENTION

1. Field of the Invention

The present invention relates to a liquid crystal display device, and more particularly, to a polarizing plate for achieving an improved brightness with a reduced total-reflection region, and a liquid crystal display device using the polarizing plate.

2. Discussion of the Related Art

Generally, it can be said that a light beam is a combination of two linear polarized light components having planes of polarization orthogonal to each other. Here, the plane of polarization is a plane including a light advance direction and an electric field, and a light component, in which the plane of polarization is limited to a single plane, is referred to as a linear polarized light component or plane polarized light component. The present invention relates to a method for fabricating a synthetic resin made polarized film used to extract a linear polarized light component.

Representative means used to extract a linear polarized light component from a light beam includes a polarizing prism formed of birefringent crystals, such as crystallized quartz.

With the recent tendency of utilizing a liquid crystal display device over various industrial fields, a thin-film shaped polarizing plate for use in the liquid crystal display device is already commercialized.

A thin-film shaped polarizing plate is widely used in various image forming apparatuses using a liquid crystal display device, such as a watch, pocket-size electronic notebook, notebook computer, camcorder, etc., or in other fields requiring the polarization of light, such as sunglasses.

On the purpose of use, the polarizing plate is valuable, in particular, when it keeps a constant polarizing performance and has a thin thickness. Such a polarizing plate is a technology-intensive product requiring all properties of high light-transmissivity, ultraviolet-ray extinction ability, water-resistance, dimensional stability, wear-resistance, etc.

A currently commercialized thin film shaped polarizing plate is configured such that a polarizing poly-vinyl-alcohol (PVA) film, which is treated with an iodine or dichromatic organic dye, is used as a polarizing substrate film, and a cellulose triacetate (CTA) film, which has a stability in dimension or deformation and wear-resistance, in addition to high transparency, ultraviolet-ray extinction ability and durability, is used as a protective film for protecting the polarizing substrate film.

In the related art, to attach a polarizing plate, which consists of a polarizing PVA film and CTA films stacked on and underneath the polarizing PVA film, to a front or rear surface of a liquid crystal display device, an adhesive layer has to be formed over the CTA film.

Although a solvent adhesive, such as an oil-based or water-based acrylic resin, has been used in the past, the adhesive requires the evaporation of a solvent after completing an attachment operation. Therefore, it is essential to provide a drying chamber for evaporation and drying of the solvent.

Further, when it is impossible to directly apply an adhesive between a polarizing substrate film and a protective film, the adhesive first has to be applied to the protective film that positively requires a release layer, and thereafter, the protective film has to be bonded to the polarizing substrate film. Furthermore, the bonding operation has a problem, such as generation of air bubbles, etc., and the resulting thin film shaped polarizing plate may contain volatile components upon the incomplete drying of the adhesive. A polyester (hereinafter, referred to as polyethylene terephthalate (PET)) film is generally used as the protective film having a release layer.

That is, the CTA film is used as a protective layer for the polarizing PVA film, and the PET film having a release layer is used as a protective layer for the overall polarizing plate onto which an adhesive is applied. The PET film is removed when the polarizing plate is attached to a liquid crystal display device.

Liquid crystal displays (LCDs), which are used in personal computers, etc., have a rapid increase in demand, and recently, the use range of LCDs is increasing even in the filed of monitors.

A polarizing plate used in LCDs is fabricated, for example, in such a manner that a poly-vinyl-alcohol (hereinafter, referred to as "PVA") film is subjected to a variety of treatments, for example, a dyeing process using a dichromatic iodine or dichromatic dye, a crosslinking process using boron, borax, or the like, and a one-axis stretching process, and thereafter, the PVA film is dried and attached to a protective film, such as a tri-acetyl-cellulose (hereinafter, referred to as "TAC"), etc.

The above dyeing, crosslinking, and stretching processes are not essentially performed separately, and may be performed simultaneously. In addition, the implementation order of these processes can be freely determined as occasion demands.

Of the related art LCD polarizing plates fabricated as described above, a polarizing plate (decomposer), which is designed to be attached to a color filter substrate, has an anti-glare (AG) layer for preventing the polarizing plate from causing a glare phenomenon by an external light.

In the course of fabricating the polarizing film and the protective film of the polarizing plate, the AG layer serves to regulate the characteristics of external and internal lights, so as to provide a liquid crystal display device with an improved image quality.

Figure 1:
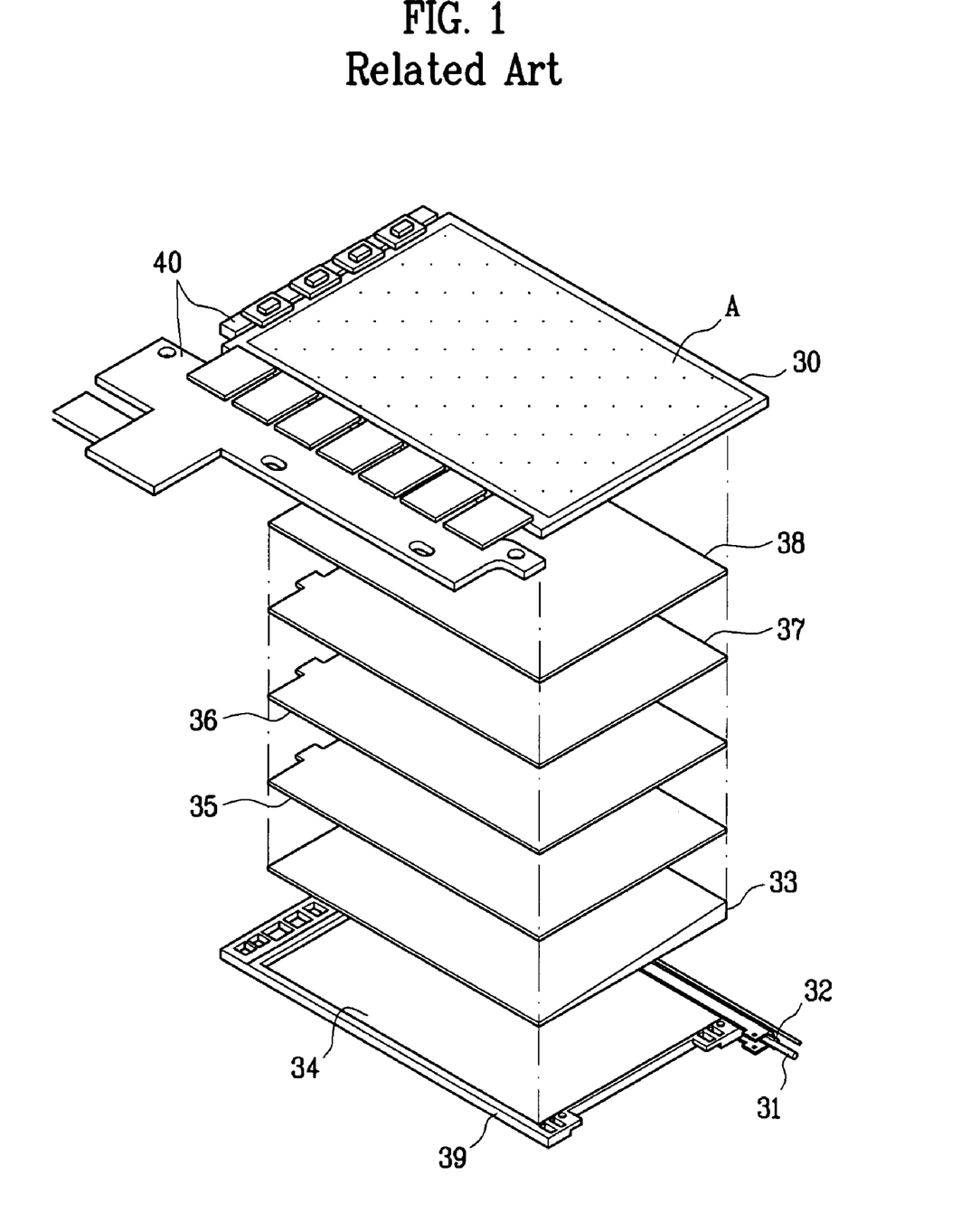
FIG. 1 is a schematic exploded perspective view illustrating a related art liquid crystal display device.

FIG. 1 is a schematic exploded perspective view illustrating a related art liquid crystal display device.

As shown in FIG. 1, the related art liquid crystal display device comprises a liquid crystal display panel 30 for displaying an image, a fluorescent lamp 31 for emitting a light beam, and a U-shaped lamp housing 32 surrounding the fluorescent lamp 31. The liquid crystal display device further comprises a protective sheet 38, a first prism sheet 37, a second prism sheet 36, a diffusive plate 35, a light guide plate 33, and a reflective plate 34, which are attached to a surface of the liquid crystal display panel 30 in sequence.

In addition, a main support 39 is provided to receive and secure the liquid crystal display panel 30 and a backlight unit.

Here, the fluorescent lamp 31, lamp housing 32, diffusive plate 35, first prism sheet 37, second prism sheet 36, protective sheet 38, light guide plate 33, and reflective plate 34 constitute the backlight unit.

The backlight unit serves to irradiate a light beam onto a display region A of the liquid crystal display panel 30. Although not shown in the drawing, the display region A of the liquid crystal display panel 30 consists of two transparent substrates, each having a polarizing plate attached to an outer surface thereof, and liquid crystals injected between inner surfaces of the two transparent substrates.

The liquid crystal display device further comprises a drive circuit 40 for driving the display region A.

The backlight unit is operated in the following method. If the fluorescent lamp 31, installed to an end surface of the light guide plate 33, is turned on, a light beam, emitted from the fluorescent lamp 31, is reflected by the lamp housing 32. The reflected beam is transmitted to another end surface of the light guide plate 33, where no fluorescent lamp 31 is installed, through a cross section of the light guide plate 33. In this way, the light beam is spread over the surface of the light guide plate 33, and subsequently, is irradiated to the display region A of the liquid crystal display panel 30 by the diffusive plate 35.

In the above described liquid crystal display device, thin film transistors formed in the liquid crystal display panel 30 control pixels according to a signal from the drive circuit 40 such that the pixels selectively pass a light beam irradiated onto the display region A. With collection of the pixels selectively passing a light beam therethrough, an image is displayed on the display region of the liquid crystal display panel 30.

Figure 2:
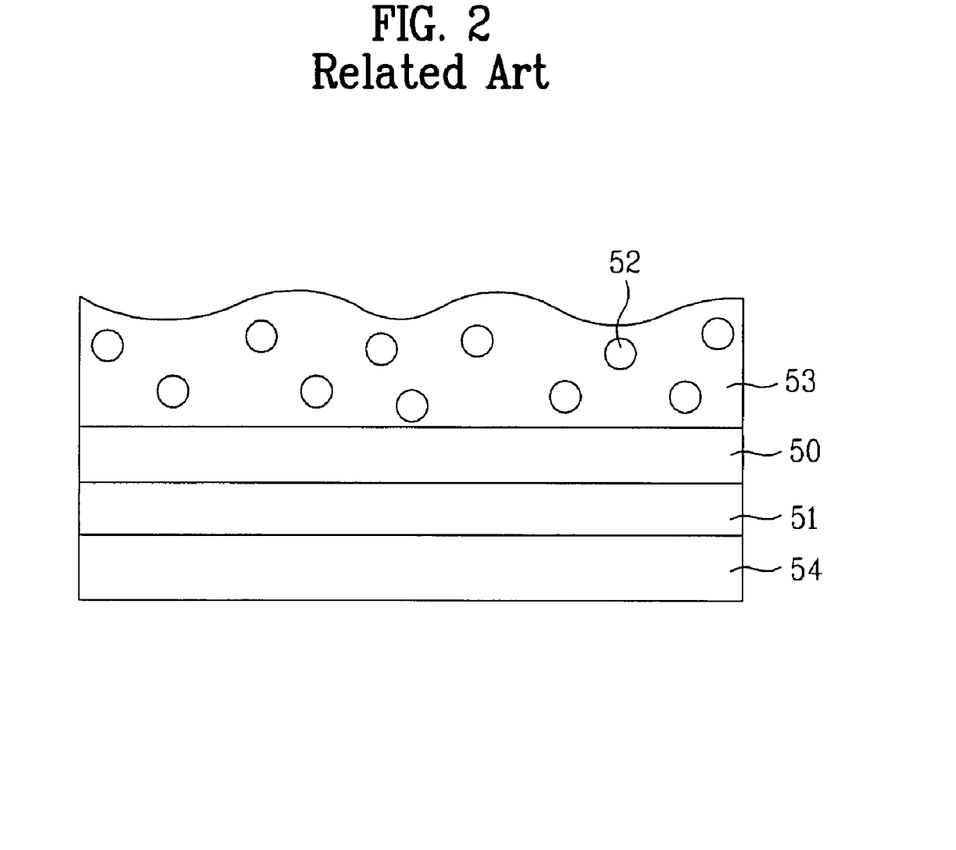
FIG. 2 is a schematic sectional view illustrating a related art polarizing plate.

FIG. 2 is a view schematically illustrating a related art polarizing plate.

Generally, a liquid crystal display device is configured such that an array substrate having a matrix array of a plurality of pixel electrodes and a color filter substrate having Red, Green, and Blue color filters are bonded to each other. The liquid crystal display device is designed to form an image in such a manner that a reflected light beam of an external light beam (in the case of a reflective liquid crystal display device) or an internal light beam is polarized by a polarizing plate, and thereafter, the polarized light beam passes through liquid crystal molecules that are twisted by an electric field.

The polarizing plate is attached to either outer surface of both the array substrate and the color filter substrate. The polarizing plate (polarizer), attached to the outer surface of the array substrate, is used to polarize an internal light beam, which is emitted from a backlight unit and introduced into the polarizing plate, into a predetermined direction, and the polarized light beam passes through another polarizing plate (decomposer) attached to the outer surface of the color filter substrate after passing through liquid crystals.

Although the above decomposer and the polarizer are the same polarizing plates as each other in view of the fact that both of them are used to polarize a light beam, they are designated with different names on the basis of the characteristics of polarized light beams.

As shown in FIG. 2, the polarizing plate, which is attached to the outer surface of the color filter substrate of the liquid crystal display device, includes a polarizing film 50, a protective film 51 formed at a lower surface of the polarizing film 50, and an anti-glare (AG) layer formed at an upper surface of the polarizing film 50 for preventing the projection of an external image and the generation of a glare phenomenon.

An adhesive layer 54 is formed at a lower surface of the protective layer 51.

Here, the AG layer, which is formed on the polarizing film 50, is formed of an acrylate layer 53 containing $SiO_2$-based polymer balls 52 mixed therein. A surface of the acrylate layer 53 has evenly formed waves due to the existence of the $SiO_2$-based polymer balls 52.

The reason why the AG layer is formed on the surface of the polarizing plate is that the surface of the polarizing plate is an even surface and therefore, when an external light beam is irradiated to the even surface in a certain direction, the light beam is reflected at a specific angle, thereby causing a glare phenomenon at a specific viewing angle.

In the present invention, since the AG layer having the evenly formed surface waves is formed by mixing the polymer balls 52 into the acrylate layer 53, the polarizing plate can allow a light beam, irradiated from the outside, to be diffused at the surface of the polarizing plate by virtue of the waves formed on the surface of the AG layer, thereby achieving an anti-glare effect.

Figure 3:
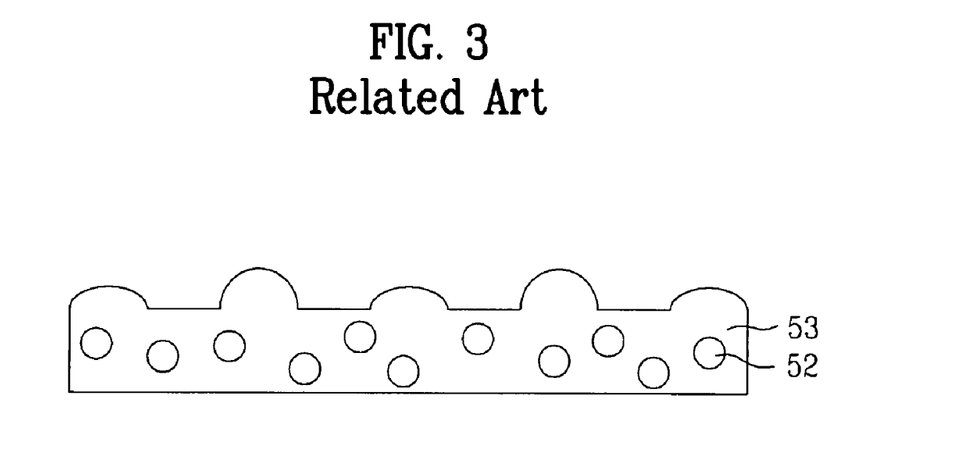
FIG. 3 is a view illustrating any possible problem of the polarizing plate shown in FIG. 2.

FIG. 3 is a view illustrating any possible problem of the polarizing plate shown in FIG. 2.

Specifically, FIG. 3 illustrates an acrylate layer to be formed on an upper surface of a polarizing film. As shown in FIG. 3, the acrylate layer 53 containing the polymer balls 52 mixed therein may be formed, at the upper surface thereof, with semi-spherical protrusions having different heights from each other.

The above polarizing plate of the related art, however, has the following problem.

When the acrylate layer 53 has surface waves due to the existence of the polymer balls 52 mixed therein, the waves tend to cause total-reflection or refraction of a light beam because of their different heights. This results in a great brightness difference between different regions of the polarizing plate. Further, such a brightness difference causes the surface of the polarizing plate to glitter, thereby resulting in a serious fatigue to the viewer's eyes.

SUMMARY OF THE INVENTION

Accordingly, the present invention is directed to a polarizing plate and a liquid crystal display device using the same that substantially obviate one or more problems due to limitations and disadvantages of the related art.

An advantage of the present invention is to provide a polarizing plate, which can achieve an improved brightness with a reduced total-reflection region by appropriately regulating the height or interval of protrusions formed at a surface of the polarizing plate, thereby reducing a fatigue of the viewer's eyes, and a liquid crystal display device using the polarizing plate.

Additional advantages, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a polarizing plate comprises: a polarizing film; a protective layer formed at a lower surface of the polarizing film; and an anti-glare layer formed at an upper surface of the polarizing film, the anti-glare layer containing a plurality of polymer balls mixed therein such that protrusions, having the same height as one another, are formed at a surface of the anti-glare layer by a predetermined interval.

In accordance with another aspect of the present invention, there is provided a liquid crystal display device comprising: a liquid crystal display panel for displaying an image; polarizing plates formed at upper and lower surfaces of the liquid crystal display panel, each polarizing plate having an anti-glare layer, which contains a plurality of polymer balls mixed therein such that protrusions, having the same height as one another, are formed at a surface of the anti-glare layer by a predetermined interval; a main support for receiving the liquid crystal display panel; and a case top for surrounding the edge of the liquid crystal display panel and the side surface of the main support It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 4:
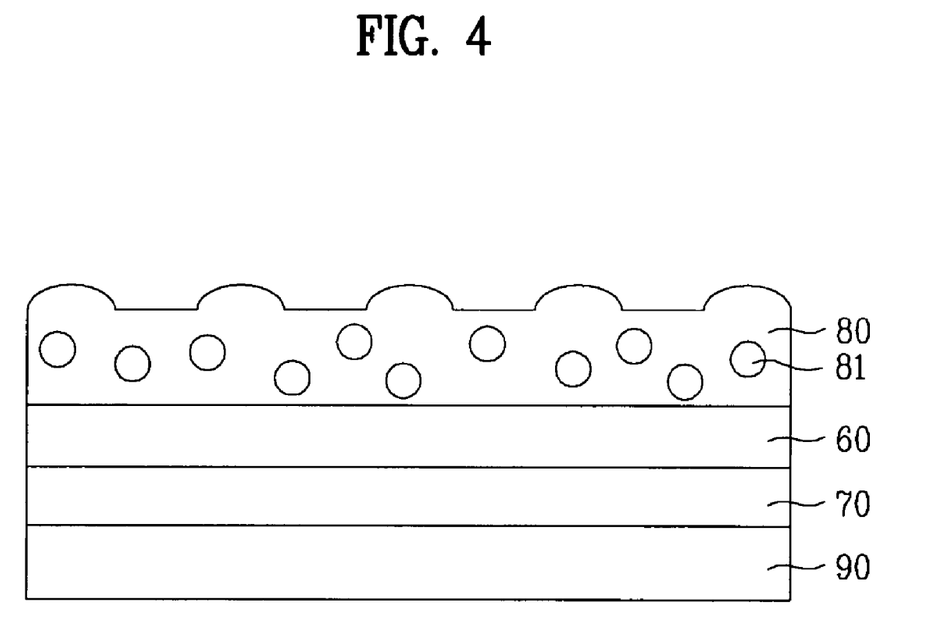
FIG. 4 is a schematic sectional view illustrating a polarizing plate in accordance with an embodiment of the present invention.

FIG. 4 is a schematic sectional view illustrating a polarizing plate in accordance with an embodiment of the present invention.

As shown in FIG. 4, the polarizing plate in accordance with an embodiment of the present invention, which will be attached to an upper or lower surface of a liquid crystal display panel displaying an image, comprises: a polarizing film 60 made of poly-vinyl-alcohol (PVA), etc.; a protective film 70 formed at a lower surface of the polarizing film 60 for protecting the polarizing film 60, the protective film 70 being made of a triacetyl cellulose (TAC) having a stability in dimension or deformation, wear-resistance, high transparency, ultraviolet-ray extinction ability, and durability; an anti-glare layer 80 formed at an upper surface of the polarizing film 60, the anti-glare layer 80 containing a plurality of polymer balls 81 mixed therein and having protrusions of even-height formed at a surface thereof by a predetermined interval; and an adhesive 90 formed at a lower surface of the protective film 70.

Here, when the anti-glare layer 80 is made of acrylate and is formed at the surface thereof with semi-spherical protrusions, the height of the protrusions from the surface is in a range of 0.25~2 μm, and preferably, is approximately 1 μm.

The polymer balls 81, mixed in the anti-glare layer 80, has a refractive index of 1.2~1.5, and thus, a refractive index of the anti-glare layer 80 is 1.2~1.5.

More preferably, the refractive index of the polymer balls 81 is 1.434, and the refractive index of the anti-glare layer 80 is 1.432.

Each protrusion, formed at the surface of the anti-glare layer 80, is divided into a total-reflection region and a refraction region. In this case, the refraction region is larger than the total-reflection region.

The protective film 70 is formed only at the lower surface of the polarizing film 60. Another protective film may be formed between the anti-glare layer 80 and the polarizing film 60.

Figure 5:
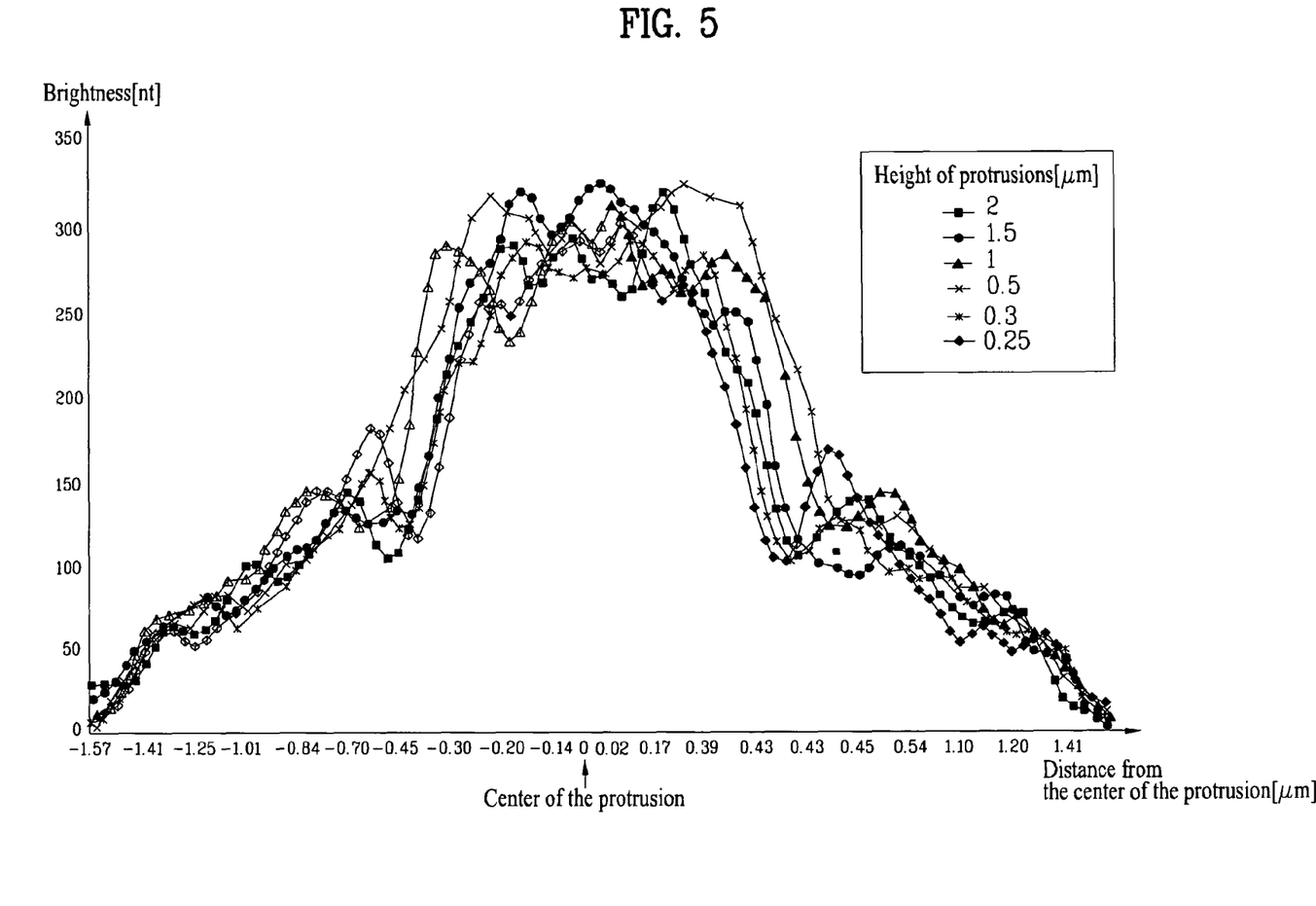
FIG. 5 is a simulation graph illustrating the brightness profile of reflection and refraction regions obtained by controlling the height of protrusions formed on the polarizing plate shown in FIG. 4.

FIG. 5 is a simulation graph illustrating the brightness profile of reflection and refraction regions obtained by controlling the height of protrusions formed on the polarizing plate.

It can be appreciated from FIG. 5 that, when the height of the protrusions formed at the polarizing plate is in a range of 0.8~1.8 μm, the polarizing plate is free from a glare phenomenon due to external light.

Meanwhile, it can be appreciated that the glare phenomenon due to external light is reduced to the maximum extent when the height of the protrusions is regulated to a value of 1 μm.

Figure 6A:
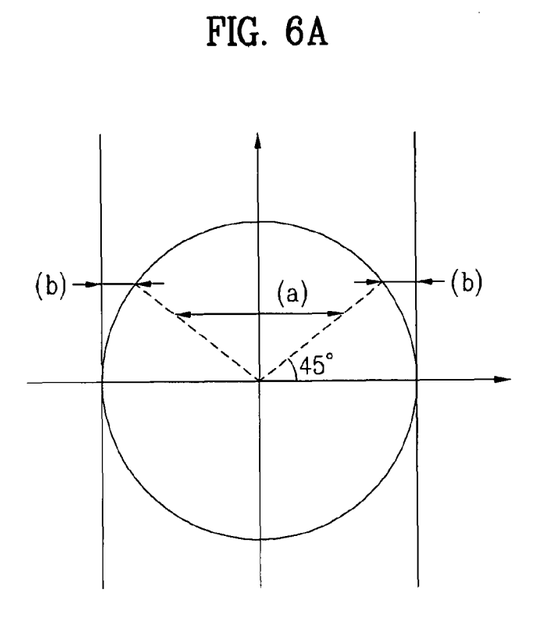
FIGS. 6A and 6B are views illustrating different proportions of a total-reflection region to a refraction region depending on the height of the protrusions formed on the polarizing plate in accordance with the present invention.
Figure 6B:
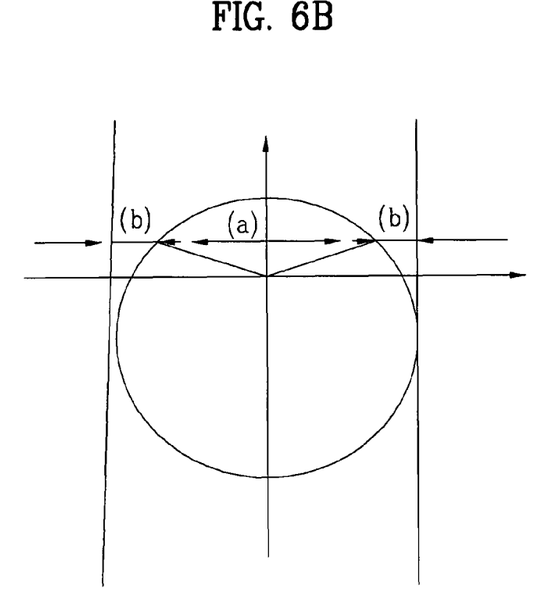

FIGS. 6A and 6B are views illustrating the proportion of a total-reflection region to a refraction region depending on the height of the protrusions formed on the polarizing plate in accordance with the present invention, respectively.

As shown in FIG. 6A, when the height of each protrusion is 2 μm, the protrusion is divided into a total-reflection region (b) and a refraction region (a). In particular, when the height of the protrusion is 1 μm, as shown in FIG. 6B, the total-reflection region (b) is reduced and the refraction region (a) is increased, because of a difference between the refractive index of polymer of 1.434 and the refractive index of air of 1.02. Such an increase in the refraction region (a) can cause an improved brightness.

In conclusion, the brightness of the polarizing plate can be increased by reducing the total-reflection region (b) and increasing the refraction region (a), and the proportion of a glittering region to a non-glittering region can be optimized when the height of the protrusions is 1 μm. Thereby, the glare phenomenon of the polarizing plate can be reduced to the maximum extent.

Figure 7:
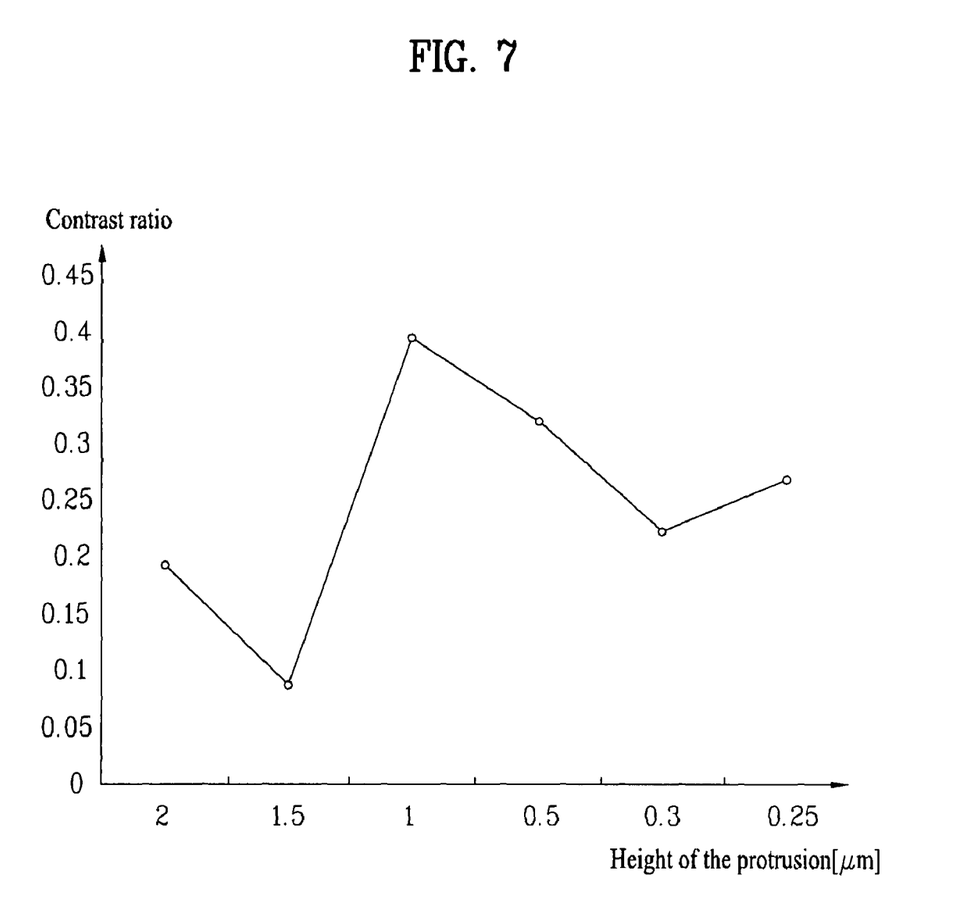
FIG. 7 is a graph illustrating contrast ratio values depending on the height of the protrusions formed on the polarizing plate in accordance with the present invention.

FIG. 7 is a graph illustrating contrast ratio values depending on the height of the protrusions formed on the polarizing plate in accordance with the present invention. In FIG. 7, vertical axis is represented the contrast ratio (light/dark), horizontal axis is represented the height of the protrusions formed on the polarizing plate.

As can be appreciated from FIG. 7, assuming that the protrusion has a semi-spherical shape and a radius of the protrusion is 2 μm, the height Rz of the protrusion is 1 μm suitable to achieve an optimum contrast ratio.

TABLE 1

| Radius (μm) | 45 degrees Rz (μm) |
|---|---|
| 2 | 1 |
| 3 | 1.5 |
| 4 | 2 |
| 5 | 2.5 |
| 6 | 3 |
| 7 | 3.5 |

As described in the Table 1, when a protruded portion of the acrylate has an inclination angle of 45 degrees, the optimum contrast ratio can be achieved regardless of the size of the protrusion.

Figure 8:
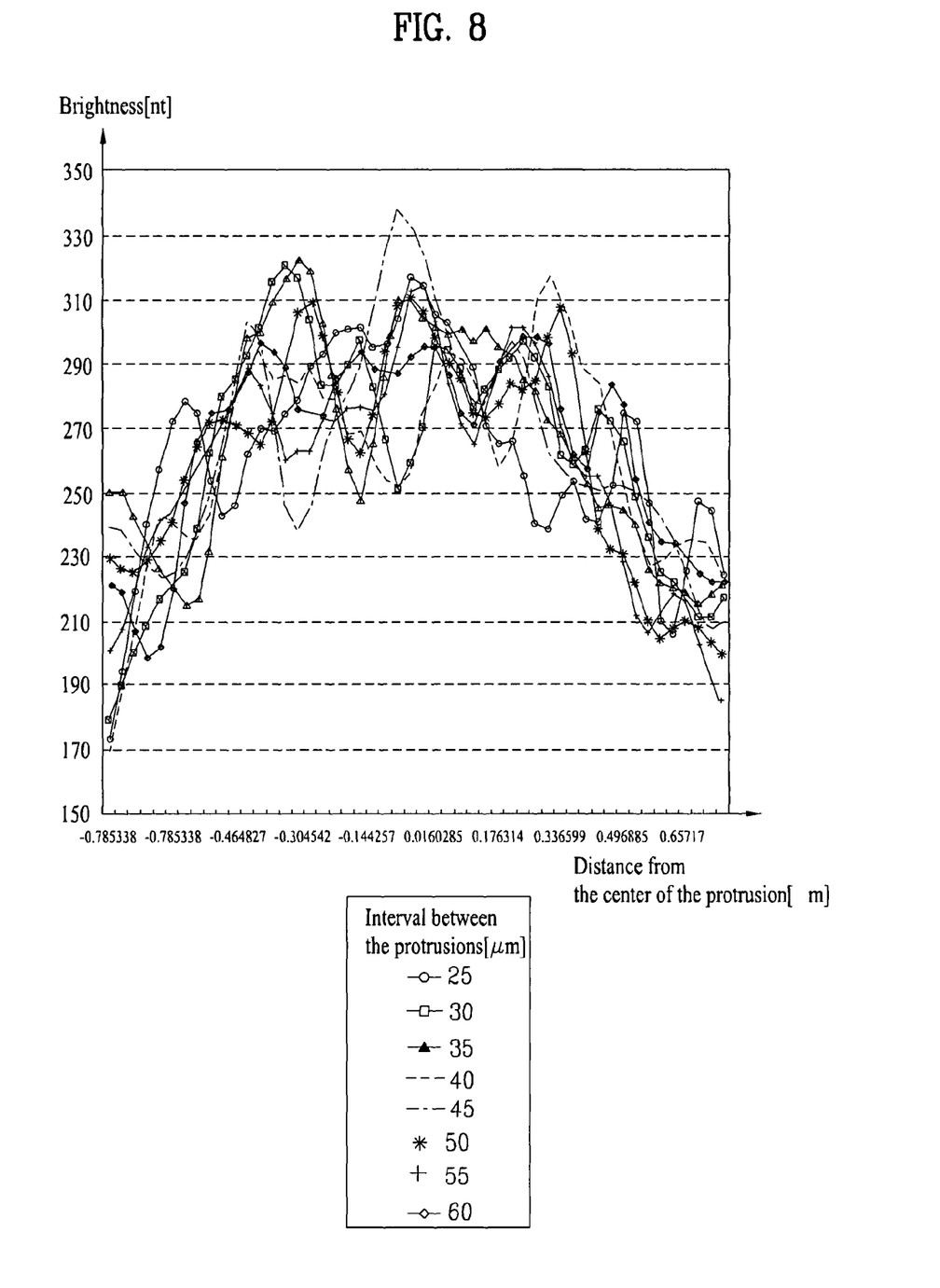
FIG. 8 is a simulation graph illustrating the characteristics of a polarizing plate in accordance with another embodiment of the present invention.

FIG. 8 is a simulation graph illustrating the characteristics of a polarizing plate in accordance with another embodiment of the present invention.

As shown in FIG. 8, the polarizing plate can achieve an even brightness throughout the overall region thereof by regulating an interval between the protrusions formed at the surface thereof. Accordingly, the polarizing plate can regulate a glitter level thereof.

That is, in the embodiment of the present invention, the polarizing plate can achieve an even brightness throughout the overall region thereof when the interval between the protrusions is in a range of 25~180 μm.

TABLE 2

| | Interval between protrusions | | | | | | | |
|---|---|---|---|---|---|---|---|---|
| | 60 | 55 | 50 | 45 | 40 | 35 | 30 | 25 |
| Peak Number | 7 | 7 | 7 | 5 | 6 | 3 | 5 | 3 |

As can be appreciated from the Table 2, the smaller the interval between the protrusions, the smaller the peak number representing a glitter level.

In conclusion, by reducing an interval between the plurality of protrusions evenly arranged at the surface of the polarizing plate, the polarizing plate can achieve an even brightness throughout the overall region thereof, and consequently, can prevent a glare phenomenon.

Figure 9:
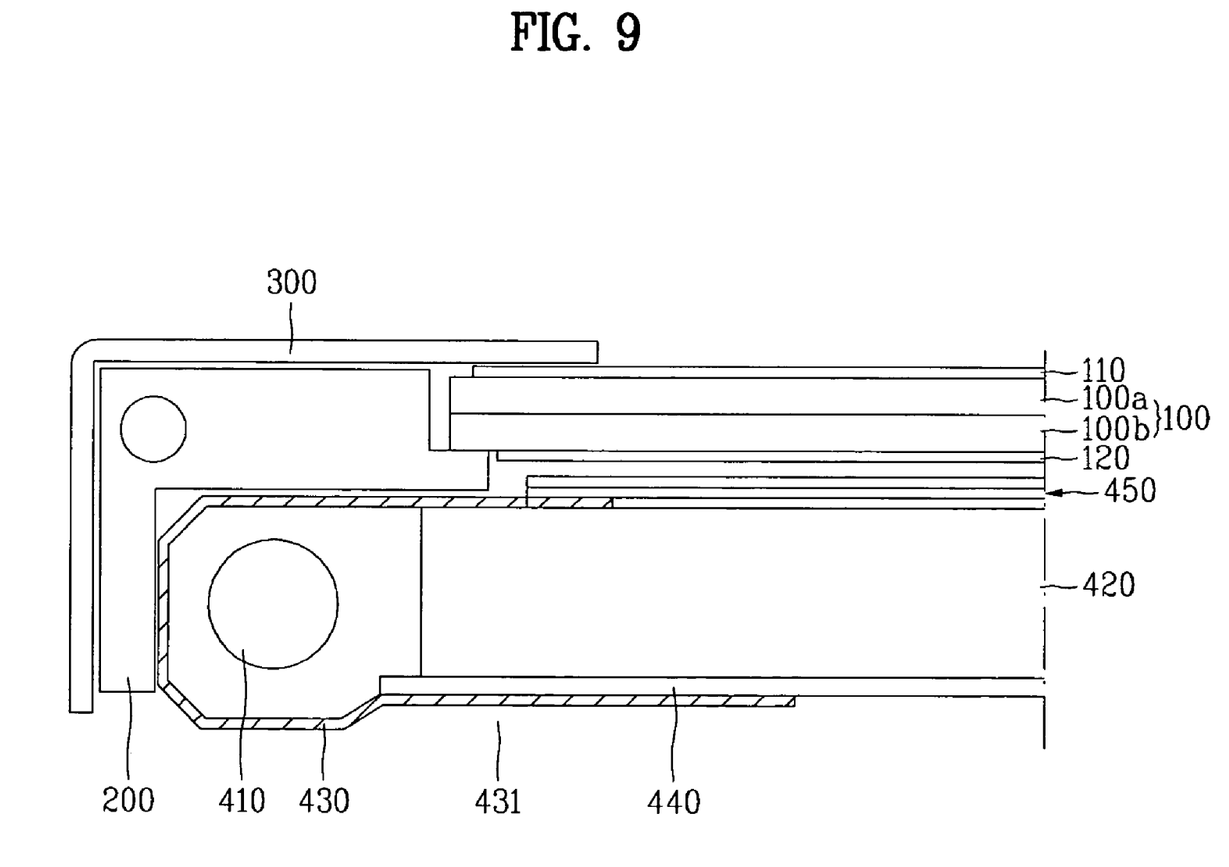
FIG. 9 is a schematic sectional view illustrating a liquid crystal display device using the polarizing plate in accordance with the present invention.

FIG. 9 is a schematic sectional view illustrating a liquid crystal display device using the polarizing plate in accordance with the present invention.

As shown in FIG. 9, the liquid crystal display device comprises a liquid crystal display panel 100 for displaying an image, a backlight unit for irradiating a light beam onto the liquid crystal display panel 100, a main support 200 for receiving the liquid crystal display panel 100 and the backlight unit 200, and a case top 300 for surrounding the edge of the liquid crystal display panel 100 and the side surface of the main support 200.

Here, the liquid crystal display panel 100 is configured such that liquid crystal cells are arranged in an active matrix form between upper and lower substrates 100a and 100b, and each liquid crystal cell is installed with a thin film transistor for switching a video signal.

As the refractive index of each liquid crystal cell is changed according to a video signal, an image corresponding to the video signal is displayed. A tape carrier package (not shown) is attached to the lower substrate 100b of the liquid crystal display panel 100. The tape carrier package is mounted with an integrated drive circuit for applying a drive signal to the thin film transistor.

A pair of polarizing plates 110 and 120 are installed to front and rear surfaces of the liquid crystal display panel 100. Here, the polarizing plates 110 and 120 serve to improve the viewing angle of an image displayed by the liquid crystal cells.

Each of the polarizing plates 110 and 120, as described in FIG. 4 in detail, has an anti-glare layer, which is formed, at a surface thereof, with a plurality of protrusions having an even height.

The polarizing plate 110 and 120 can keep an even brightness throughout the overall region thereof by regulating the height and distance of protrusions formed at the surface thereof. In this case, the height of the protrusions may be in a range of 0.8~1.8 μm, and the interval of the protrusions may be in a range of 25~180 μm.

The backlight unit comprises a lamp 410 for irradiating a light beam onto the liquid crystal display panel 100 upon receiving power from an external power source through a wire, a light guide plate 420 for guiding the light beam, which is introduced via a light input portion formed at a side surface thereof facing the lamp 410, toward the liquid crystal display panel 100, a lamp housing 430 surrounding the lamp 420 and the light input portion of the light guide plate 420, a reflective plate 440 disposed at a rear surface of the light guide plate 420, and a plurality of optical sheets 450 for irradiating light, emitted from the light guide plate 420, onto the liquid crystal display panel 100 with an improved transmission efficiency of light.

The lamp housing 430 serves to increase the transmission efficiency of light irradiated from the lamp 410 and to prevent the loss of light. The lamp housing 430 is arranged such that the lamp housing 430 is overlapped with at least a part of the light guide plate 420 and at least a part of a lower surface of the reflective plate 440, so as to support the light guide plate 420 and the reflective plate 440.

As apparent from the above description, the polarizing plate and the liquid crystal display device using the same according to the present invention have the following effects.

Firstly, by regulating the height of protrusions formed at the surface of the polarizing plate, it is possible to reduce a total-reflection region of each protrusion, resulting in an improved brightness.

Secondly, by allowing the protrusions formed at the surface of the polarizing plate to have an even height, the polarizing plate can achieve an even brightness profile depending on the proportion of a reflection region to a refraction region, and consequently, has the effect of preventing a fatigue of the viewer's eyes.

Thirdly, by regulating the interval of the protrusions formed at the surface of the polarizing plate, the polarizing plate can achieve an improved brightness with a reduced total-reflection region.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A polarizing plate comprising:
a polarizing film;
a protective layer formed at a lower surface of the polarizing film; and an anti-glare layer formed at an upper surface of the polarizing film, the anti-glare layer containing a plurality of polymer balls mixed therein such that protrusions, having substantially the same height as one another, are formed at a surface of the anti-glare layer by a predetermined interval, wherein each of the protrusions formed at the surface of the anti-glare layer is divided to a total-reflection region and a refraction region substantially larger than a total-reflection region.

2. The polarizing plate according to claim 1, wherein the anti-glare layer is made of acrylate.

3. The polarizing plate according to claim 1, further comprising:

an adhesive formed at a lower surface of the protective layer.

4. The polarizing plate according to claim 1, wherein the refractive index of the polymer balls is in a range of about 1.2 to about 1.5.

5. The polarizing plate according to claim 1, wherein the refractive index of the anti-glare layer is in a range of about 1.2 to about 1.5.

6. The polarizing plate according to claim 1, wherein the protrusions of the anti-glare layer have a height of about 0.8 to about 1.8 μm from the surface of the anti-glare layer.

7. The polarizing plate according to claim 1, wherein the interval between the protrusions is in a range of about 25 to about 180 μm.

8. A liquid crystal display device comprising:

a liquid crystal display panel for displaying an image;

polarizing plates formed at upper and lower surfaces of the liquid crystal display panel, each polarizing plate having an anti-glare layer, which contains a plurality of polymer balls mixed therein such that protrusions, having substantially the same height as one another, are formed at a surface of the anti-glare layer by a predetermined interval;

a main support for receiving the liquid crystal display panel; and a case top for surrounding the edge of the liquid crystal display panel and the side surface of the main support, wherein each of the protrusions formed at the surface of the anti-glare layer is divided to a total-reflection region and a refraction region substantially larger than a total-reflection region.

9. The liquid crystal display device according to claim 8, wherein the height of the protrusions is in a range of about 0.8 to about 1.8 μm.

10. The liquid crystal display device according to claim 8, wherein the interval between the protrusions is in a range of about 25 to about 180 μm.

11. The liquid crystal display device according to claim 8, wherein the refractive index of the polymer balls is in a range of about 1.2 to about 1.5.

12. The liquid crystal display device according to claim 8, wherein the refractive index of the anti-glare layer is in a range of about 1.2 to about 1.5.

\* \* \* \* \*